United States Patent [19]

Nilssen

[11] Patent Number: 4,882,663
[45] Date of Patent: Nov. 21, 1989

[54] MOSFET FLYBACK CONVERTER

[76] Inventor: Ole K. Nilssen, Caesar Dr., Rte. 5, Barrington, Ill. 60010

[21] Appl. No.: 338,513

[22] Filed: Apr. 10, 1989

Related U.S. Application Data

[63] Continuation of Ser. No. 812,721, Dec. 23, 1985, abandoned.

[51] Int. Cl.$^4$ ............................................. H02M 3/338
[52] U.S. Cl. ................................. 363/19; 219/10.55 B; 323/222; 331/112; 363/131
[58] Field of Search ........................... 363/18, 19, 131; 331/111, 112; 323/222

[56] References Cited

U.S. PATENT DOCUMENTS

| | | | |
|---|---|---|---|
| 3,435,320 | 3/1969 | Lee et al. | 331/112 |
| 3,571,697 | 3/1971 | Phillips | 323/222 |
| 4,001,867 | 1/1977 | Kravitz et al. | 307/299 A |
| 4,445,055 | 4/1984 | Bete | 323/351 |
| 4,459,539 | 7/1984 | Cordy | 323/288 |
| 4,562,527 | 12/1985 | Klampt | 323/222 |

FOREIGN PATENT DOCUMENTS

| | | | |
|---|---|---|---|
| 2485288 | 12/1981 | France | 323/222 |
| 24646 | 3/1978 | Japan | 219/10.55 B |
| 190285 | 11/1983 | Japan | 363/131 |

OTHER PUBLICATIONS

Kent, "Single Coil 9V Voltage Converter", New Electronics, vol. 15, No. 6, p. 26, Mar. 23, 1982.
Berzin et al., "Ultralow-Frequency Blocking Oscillator using MOS Transistors," Instrum. & Exp. Tech. (U.S.A.) vol. 20, No. 4, pp. 1092-1094 (Jul.-Aug. 1977) (Publ. Feb. 1978).

Primary Examiner—William H. Beha, Jr.

[57] ABSTRACT

In a flyback converter, a 15 Amp N-channel power MOSFET is driven to saturation by a gate voltage derived by connecting the gate to the relatively high-magnitude (150 volt) B+ voltage by way of a resistor of relatively high resistance (about 20 kilo-Ohm). Current flowing through this resistor causes the gate capacitance (3600 pico-Farad) to charge at a rate of about 2 Volt per micro-second. Since the forward transconductance of the MOSFET is 6 mhos or more, a situation has been established where the MOSFET is effectively fully switched ON as long as the MOSFET's drain current does not rise at a rate higher than about 12 Amp per micro-second.

Eventually, the magnitude of the gate voltage reaches a predetermined maximum level (about 20 Volt), at which point a threshold device, which is connected between gate and source, breaks down and rapidly discharges the base capacitance, thereby rapidly switching the MOSFET into a non-conducting state.

An ordinary bi-polar control transistor is also connected between gate and source, and this control transistor is made conductive by a small current from a secondary winding on the flyback inductor. This control transistor makes the threshold device de-latch and also keeps the gate shorted to the source for as long as the flyback inductor is in the process of discharging its energy.

12 Claims, 2 Drawing Sheets

MOSFET FLYBACK CONVERTER

This is a continuation of Ser. No. 812,721 filed Dec. 23, 1985, now abandoned.

BACKGROUND OF THE INVENTION

1. Field of Invention

The present invention relates to flyback converter-type power supplies, particularly of a type using MOSFET devices and having means to control the output.

2. Prior Art

Flyback converter-type power supplies using MOSFET devices are well known. However, compared with the actual drive requirements of a MOSFET in a flyback converter, present drive circuits are relatively complex and/or costly.

SUMMARY OF THE INVENTION

Objects of the Invention

An object of the present invention is that of providing a particularly simple and cost-effective drive and control circuit for a MOSFET flyback converter.

These as well as other important objects and advantages of the present invention will become apparent from the following description.

BRIEF DESCRIPTION

In a flyback converter, a 15 Amp N-channel power MOSFET (an MTM15N40 from Motorola) is driven to saturation by a gate voltage derived by connecting the gate to the relatively high-magnitude (150 Volt) B+ voltage by way of a resistor of relatively high resistance (about 20 kilo-Ohm). Current flowing through this resistor causes the gate capacitance (3600 pico-Farad) to charge at a rate of about 2 Volt per micro-second. Since the forward transconductance of this particular MOSFET is 6 mhos or more, a situation is thereby established by which the MOSFET exists in a substantially fully conductive state as long as the MOSFET's drain current does not rise at a rate higher than about 12 Ampere per micro-second.

In this connection, it should be noted that—with a B+ voltage of 150 Volt—the flyback inductor may have an inductance as low as about 15 micro-Henry without giving rise to a situation wherein the drain current rises so fast as to cause the MOSFET to go out of saturation.

Eventually, the magnitude of the gate voltage reaches a predetermined maximum level (20 Volt), at which point a threshold device, such as a low-voltage so-called Sidac, connected between gate and source, breaks down and rapidly discharges the base capacitance, thereby rapidly switching the MOSFET into a non-conducting state.

An ordinary bi-polar control transistor is also connected between gate and source, and this control transistor is made periodically conductive by a small current from a secondary winding on the flyback inductor. This control transistor makes the threshold device de-latch and also keeps the gate shorted to the source for as long as the flyback inductor is in the process of discharging its energy. Thus, since the MOSFET can not enter its conductive state until after the flyback inductor is fully discharged, effective protection against short circuiting is attained.

Adjusting the magnitude of the resistor connected between B+ and the gate causes a corresponding adjustment of the length of the period during which the MOSFET exists in a conductive state; which means that the amount of power provided at the output of the flyback converter power supply is correspondingly adjusted: the shorter the length of the MOSFET ON-time, the less power transferred.

In a typical application, the flyback converter is used for powering a magnetron in a microwave oven, and operates at a frequency adjustable around 30 kHz.

PROBLEM SITUATION UNDERLYING INVENTION

Figure 1:
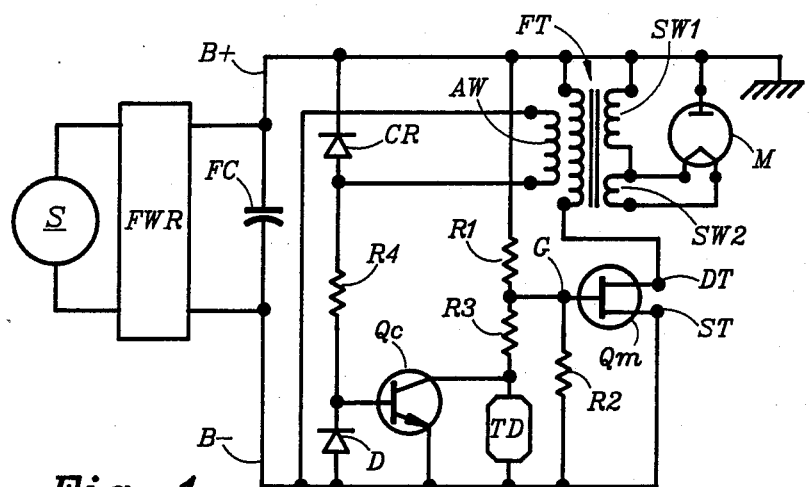
FIG. 1 provides a schematic circuit diagram of a basic version of the preferred embodiment of the invention.

The present invention is not aimed at solving any expressly enunciated problems associated with flyback converter-type power supplies. Rather, it is based on a combination of perceptions and recognitions related to how it may be possible to improve and simplify such power supplies to a significant degree, especially in connection with the use of MOSFET devices. Some of these perceptions and recognitions are identified as follows.

1. In a MOSFET flyback-type power supply, the normal modus operandi is that of the MOSFET being used as an ON/OFF switch in such manner as periodically to connect and disconnect an inductor (the flyback inductor) with/from a source of DC voltage. When initially connected, current through the inductor, and therefore through the MOSFET, is zero; but thereafter, as long as the MOSFET conducts in an effective manner, the current rises in a substantially linear manner at a rate determined by the magnitude of the applied DC voltage divided by the inductance of the flyback inductor.

When the current through the MOSFET is low, a relatively low-magnitude gate voltage is sufficient to keep the MOSFET saturated. However, as current through the MOSFET increases, the gate voltage must exhibit a correspondingly increasing magnitude.

Thus, it is seen that it is not necessary to drive the MOSFET with a squarewave voltage—which is what is normally done in such situations. Rather, it becomes possible to drive the MOSFET to saturation by way of a relatively slowly rising voltage—such as may be attained by a simple R-C integrating arrangement, where the C could be the gate input capacitance of the MOSFET.

As a result, a fully adequate gate drive may be attained by the very simple means of connecting a resistor between the gate and the B+ terminal of the DC voltage supply.

2. When the gate voltage in a MOSFET exhibits a more-or-less linearly rising magnitude, it becomes particularly simple to provide for a control means operative to abruptly bring the magnitude of the gate voltage back down to near-zero (i.e., to discharge the base input capacitance), and thereby to efficiently and rapidly switch the MOSFET into a non-conductive state.

This control means can simply be a bistable threshold device, such as a Sidac-type or unijunction-type device, so selected or designed as to precipitously change from a relatively high resistance value to a relatively low resistance value as soon as the magnitude of the voltage across it reaches a predetermined level.

3. When the MOSFET switches into a non-conductive state, the voltage across the flyback inductor reverses its polarity; which implies that an auxiliary winding on this inductor can provide a reverse voltage for as long as the inductor is in the process of discharging its energy. This reverse voltage can then be used to cause the bistable threshold device to de-latch as well as to maintain the gate voltage at a near-zero magnitude until the inductor has finished discharging its energy.

DESCRIPTION OF THE PREFERRED EMBODIMENTS

Details of Construction

FIG. 1 shows an AC voltage source S, which in reality is an ordinary 120 Volt/60 Hz electric utility power line.

Connected to S is a full-wave rectifier FWR that rectifies the AC voltage from S and provides the rectified current to a filter capacitor FC, wherefrom is provided a substantially constant-magnitude DC voltage between a positive power bus B+ and a negative power bus B−.

Connected between the B+ bus and drain terminal DT of a MOSFET Qm is the primary winding of a flyback transformer FT. Source terminal ST of MOSFET Qm is connected with the B− bus.

Transformer FT has a first secondary winding SW1 and a second secondary winding SW2. One terminal of winding SW1 is connected with the anode of a magnetron M; which anode is connected to ground. The other terminal of winding SW1 is connected with one of the terminals of winding SW2. The two terminals of winding SW2 are connected with the two terminals of the thermionic cathode of magnetron M.

Flyback transformer FT has an auxiliary winding AW, one terminal of which is connected with the B− bus, the other terminal of which is connected with the anode of a clamping rectifier CR. The cathode of rectifier CR is connected with the B+ bus.

A first resistor R1 is connected between the B+ bus and gate G of MOSFET Qm and a second resistor R2 is connected between gate G and the B− bus. A third resistor R3 is connected in series with a threshold device TD to form a series-combination; which series-combination is connected between gate G and the B− bus.

A control transistor Qc is connected with its collector to gate G and with its emitter to the B− bus. A diode D is connected with its cathode to the base of transistor Qc and with its anode to the B− bus. A fourth resistor R4 is connected between the base of transistor Qc and the anode of clamping rectifier CR.

Figure 2:
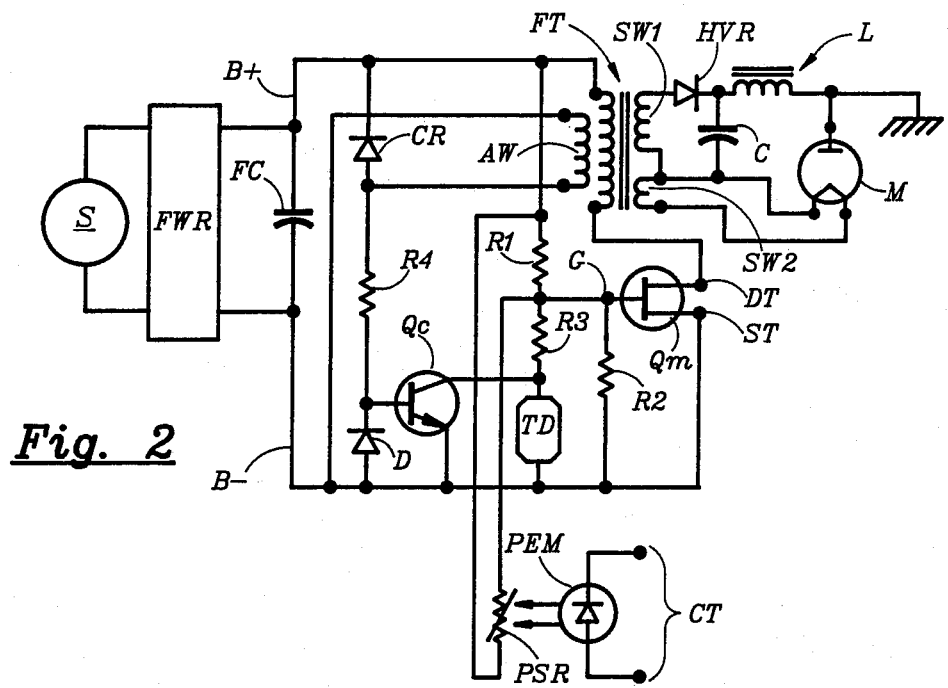
FIG. 2 provides a schematic circuit diagram of a modified version of the preferred embodiment.

The circuit of FIG. 2 is identical to that of FIG. 1 except in two respects.

First, a photo-sensitive resistor PSR is connected in parallel with resistor R1; and this photo-sensitive resistor is placed near to and in photo-responsive relationship with a photo-emitting means PEM, which is connected with and actuated from a pair of control terminals CT.

Second, between the terminals of winding SW1 and magnetron M are interposed: (i) a high voltage rectifier HVR having its anode connected with one of the terminals of winding SW1, (ii) a capacitor C connected between the cathode of rectifier HVR and the other terminal of winding SW1, and (iii) an inductor L connected between the cathode of rectifier HVR and the anode of magnetron M.

Explanation of Waveforms

FIG. 3a shows the waveform of the voltage at gate G of MOSFET Qm as observed with reference to the B− bus.

FIG. 3b shows the corresponding voltage at drain terminal DT of the MOSFET.

FIG. 3c shows the corresponding current flowing through the primary winding of transformer FT and into drain terminal DT of the MOSFET.

FIG. 3d shows the corresponding current flowing out from first secondary winding SW1 and into the anode of magnetron M.

Description of Operation

The operation of the power supply arrangement of FIG. 1 may be explained as follows.

In FIG. 1, after having been connected with the power line, a substantially constant-magnitude DC voltage exists between the B+ bus and the B− bus. As a result of this DC voltage, a unidirectional current flows through resistor R1 (about 20 kOhm) and into the capacitance (about 3600 pF) of gate G, thereby causing the voltage on the gate to rise in a substantially linear manner. (The value of R2 is about 1.0 megOhm and has negligible effect on the circuit's operation as herein relevant.)

As the magnitude of the gate voltage rises—assuming a starting point of near-zero voltage—the MOSFET (Ex: Motorola type MTM15N40) will soon become conductive (after 2 micro-seconds or so and at about 3.5–4.0 Volt), and current will start to flow through the primary winding of flyback transformer FT.

The magnitude of the gate voltage will keep on rising until it reaches a magnitude (just under 20 Volt) at which threshold devide TD will break down and become conductive, thereby effectively placing resistor R3 (about 12 Ohm) in shunt between the gate and source terminal ST; which, in turn causes the gate capacitance to rapidly discharge, thereby bringing the magnitude of the gate voltage back down to near-zero within a timespan of 100 nano-seconds or so.

As long as the MOSFET existed in a saturated conductive state, substantially the full B+ voltage was applied across the primary winding of the flyback transformer; which transformer has a substantial built-in inductance; which, in turn, is to say that the transformer must have an air-gap. In other words, during this MOSFET's ON-period, the magnitue of the voltage on the drain terminal (DT) is near-zero when referenced to the source terminal (ST) or the B− bus.

As long as the B+ voltage is present across this primary winding, energy becomes stored in the inductance of the transformer; and at the end of the MOSFET conduction period—i.e., at the point just before the MOSFET ceases to conduct—the energy stored is equal to the amount of energy needed by the magnetron for each cycle of the inverter. Thus, at an inversion frequency of 33 kHz and a magnetron power requirement of 800 Watt, the energy required per inversion cycle (or per flyback cycle) is about 24 milli-Joule;

which is to say that the energy that must be stored in the inductance of the flyback transformer at the end of the period of the MOSFET being conductive, must be about 24 milli-Joule. (With a B+ voltage of 150 Volt, this implies that the magnitude of the current flowing through the MOSFET just prior to turn-off is on the order of about 16 Ampere, assuming an effective MOSFET ON-period of about 10 micro-seconds per cycle.)

With inductive energy stored in the flyback transformer, and with the gate voltage reduced to near-zero—thereby switching OFF the MOSFET—the voltage on the drain terminal (DT) rises to the point of becoming limited by whatever might be loading the transformer. Under normal operating conditions, this loading would be due to the magnetron.

The voltage transformation ratio of the flyback transformer is so arranged that the magnitude of the reverse-voltage resulting across the primary winding of the flyback transformer (during the period when the stored-up energy discharges itself into the magnetron) is about 85 Volt. As a necessary consequence, it takes about 18 micro-seconds for the inductive energy in the flyback transformer to discharge itself into the magnetron.

According to above considerations, just after the point is reached at which the threshold device (TD) breaks down and causes the magnitude of the gate voltage to drop to near-zero (thereby switching the MOSFET off), the magnitude of the voltage on the drain terminal (DT) increases from near-zero to about 85 Volt higher than the B+ voltage; which, due to the chosen primary-to-auxiliary turns-ratio, makes the magnitude of the voltage across auxiliary winding AW about 60 Volt.

With about 60 Volt present at the point to which resistor R4 is connected with the anode of rectifier CR, current starts flowing into the base of transistor Qc, which therefore will become conductive, thereby preventing the voltage on the gate of the MOSFET from rising as long as the inductive energy in the flyback transformer is being discharged (i.e., for as long as the 60 Volt is present).

As soon as the inductive energy has been completely discharged, the magnitude of the voltage feeding resistor R4 falls to near-zero; and transistor Qc now ceases to conduct. At this point, the MOSFET gate voltage starts rising again (at a rate of about 2 Volt per micro-second); and, about 2 micro-seconds later, the gate voltage will have reached a magnitude (4 Volt large enough to cause the MOSFET once more to start conducting; from which point the cycle repeats.

With transformer winding polarities as indicated, the magnetron will conduct during the period when the flyback transformer discharges its energy. However, being in effect an electronic diode, the magnetron does not conduct (between its cathode and anode) during the period when the flyback transformer is being charged up. During that time, it only draws the relatively modest level of power associated with heating the cathode.

During the short period before the magnetron is operable to represent an effective load to the flyback transformer—i.e., while the thermionic cathode is in the process of becoming incandescent—most of the energy stored in the flyback transformer will be discharged back into filter capacitor FC by way of clamping rectifier CR. During this mode of operation, the voltage present across the auxiliary winding must by necessity be equal to the B+ voltage (i.e., about 150 Volt).

The operation of the circuit arrangement of FIG. 2 is in most respects identical to that of FIG. 1. However, in addition to the obvious differences associated with the filtering of the magnetron current and the control provided by the photo-sensitive resistor (PSR) and the photo-emitting means (PEM), a few changes in timing and turns-ratios have been made.

In FIG. 2, the MOSFET ON-time has been increased to about 13 micro-seconds; and the MOSFET OFF-time has been decreased to about 15 micro-seconds (which still leaves a dead period of about 2 micro-seconds). Also, as a necessary corollary, the voltage present across the auxiliary winding during the discharge of the inductive energy from the flyback transformer has been increased from 85 Volt to about 130 Volt.

As additional consequences of these different values of MOSFET ON-time and OFF-time, the peak MOSFET drain current is reduced from 16 Ampere to about 13 Ampere, and the maximum voltage presented to the magnetron is now limited to being only a little higher than its normal operating voltage.

The operation of the control arrangement consisting of the photo-sensitive resistor and the photo-emitting means is explained as follows.

With no light provided by the photo-emitting means, the resistance of the photo-sensitive resistor is very high in comparison with that of R1; which means that the control arrangement has no effect under this condition, and that the magnetron now receives its maximum flow of power. However, as light is provided to PSR (as emitted from PEM—which, in turn, results from current provided to control terminals CT) its resistance decreases, thereby giving rise to a shortening of the time it takes for the capacitance of the MOSFET gate to charge to a given voltage level.

Thus, with light provided to the photo-sensitive resistor, the MOSFET ON-time is shortened; which implies that the power provided to the magnetron will be reduced.

In this connection, it should be noted that—while flyback conversion frequency will increase essentially as a linear function of shortened ON-time—the energy stored and transferred to the magnetron per cycle will decrease as a square function of the shortening of the ON-time; which explains why the net power provided to the load will decrease substantially in linear relationship with the decreased ON-time.

Figure 3:
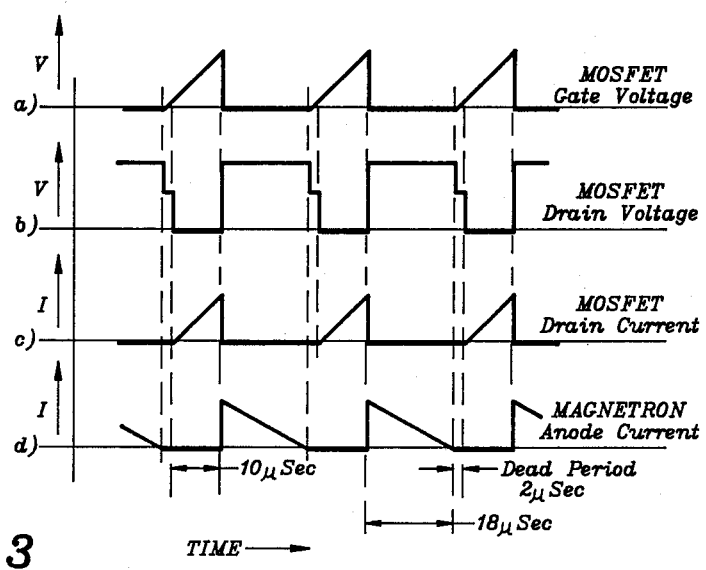
FIG. 3 shows voltage and current waveforms associated with both embodiments.

Additional Comments (a) The waveforms of FIG. 3 are principally relevant in connection with the circuit arrangement of FIG. 1. However, except for the waveform of FIG. 3d and for the somewhat different proportioning of MOSFET ON-times versus OFF-times, they are also applicable to the circuit arrangement of FIG. 2.

(b) There are simple ways by which the 2 micro-second dead period (see FIG. 3) may be substantially eliminated. For instance, by the use of a Zener diode connected in series between the emitter of transistor Qc and the B− bus, and by having the one terminal of the PUT connected with this emitter rather than with the B− bus, it is readily possible to assure that the MOSFET gate capacitance never gets discharged further than necessary to assure complete MOSFET turn-off. With most presently common MOSFETS, this would imply the use of a Zener diode with a Zener voltage of about 3 Volt.

(c) Due to the filtering by capacitor C and inductor L in the circuit arrangement of FIG. 2, the anode current provided to the magnetron in that arrangement becomes continuous and substantially constant in magnitude.

(d) With but a change in the number of turns on secondary winding SW1, the circuit of FIG. 2 would be directly applicable as a conventional DC power supply or a battery charger; in which case, of course, secondary winding SW2 could be removed.

(e) Instead of using clamping rectifier CR, as combined with the DC supply voltage, as a voltage clamping means to limit the maximum magnitude of the voltage developing across the primary winding of the flyback transformer during its discharge of inductive energy, a Zener diode may be used. However, unless a scheme of inverter disablement is used, the power rating of this Zener diode would have to be quite large.

(f) Threshold device TD can be any one of a variety of devices, such as: (i) a high-frequency SCR combined with a Zener diode; (ii) a so-called Sidac; (iii) a unijunction transistor; (iv) a programmable unijunction transistor (PUT); (v) a Silicon Controlled Switch; (vi) a custom-made IC threshold means; etc. The particular choice in a given application would depend on the particular characteristics desired in terms of speed, threshold voltage, forward conductivity and voltage drop, etc.

(g) It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. Converter means adapted to convert a DC voltage to an alternating voltage, comprising:

transformer means having a primary winding;

switch means having a pair of switched terminals and a pair of control terminals, the switch means being operative to permit relatively unimpeded flow of current between the switched terminals, but only as long as: (i) a control voltage is applied between its control terminals, and (ii) the magnitude of this control voltage exceeds a minimum level, this minimum level being approximately proportional to the magnitude of the current flowing between the switched terminals;

connect means operative to connect the primary winding and the switched terminals in circuit with the DC voltage in such manner that, as long as the switch means is operative to permit relatively unimpeded flow of current between its switched terminals, the DC voltage is effectively applied across this primary winding; and control means connected with the control terminals and operative to provide a control voltage having a periodically varying magnitude that, whenever current is flowing between the switched terminals, is: (i) substantially proportional to the magnitude of this current, and (ii) in excess of said minimum level.

2. The converter means of claim 1 wherein periodically the magnitude of the control signal is abruptly reduced below the the minimum level for a brief period of time, thereby to prevent current from flowing freely between the switched terminals.

3. The converter means of claim 1 wherein the current flowing between the switched terminals and the control voltage are both substantially characterized by consisting of periodically-occurring triangularly shaped pulses.

4. The converter means of claim 1 wherein a load means is connected with the transformer means, this load means being operative to absorb energy from the transformer means, but substantially only during periods when no current flows between the switched terminals.

5. The converter means of claim 1 wherein the transformer means comprises inductive energy-storing means.

6. A DC-to-DC converter adapted to be powered from a DC voltage and to provide DC power to a load, comprising:

inductor means;

switch means connected in series with the inductor means to form a series-combination, the series-combination being connected across the DC voltage, the switch means having control means operative on receipt of a control voltage at a pair of control terminals to render the switch means: (i) substantially non-conductive as long as the magnitude of the control voltage does not exceed a threshold level; and (ii) substantially fully conductive as long as the magnitude of the control voltage exceeds the threshold level by an amount that is substantially proportional to the magnitude of the current flowing through the switch means;

control source operative to provide a control voltage to the control terminals, this control voltage alternating periodically in magnitude between a first state of being below the threshold level to a second state of being above the threshold level, the second state being characterized by the magnitude of the control voltage being above the threshold level by an amount substantially proportional to the magnitude of the current flowing through the switch means; and load circuit means operative to connect the load in circuit with the inductor means in such manner as to cause the load to receive DC power substantially only during periods when the switch means is substantially non-conductive.

7. The DC-to-DC converter means of claim 6 wherein the control signal is further characterized by having a waveshape comprising a first portion of substantially linearly rising magnitude followed by a relatively rapid drop in magnitude to a second portion of substantially non-varying magnitude.

8. The DC-to-DC converter of claim 6 wherein the control source comprises a threshold device operative, whenever the magnitude of the voltage between the control terminals reaches a certain magnitude, to cause a shunt of relatively low impedance to be placed across the control terminals.

9. The DC-to-DC converter of claim 6 wherein the magnitude of the control voltage is prevented from exceeding the threshold level as long as there is any substantive amount of energy stored in the inductor means.

10. A flyback converter adapted to be powered from a DC voltage and comprising:

a semiconductor switching device having a pair of switched terminals and a pair of control terminals, electric current being: (i) permitted to flow substantially freely between the switched terminals as long as the control terminals are provided with a control voltage of minimum magnitude that exceeds a threshold level by an amount that is substantially proportional to the magnitude of any current flowing between the switched terminals; and (ii) substantially prevented from flowing between the switched terminals as long as the control terminals are provided with a control voltage of magnitude less than the threshold level;

an inductor means connected between the DC voltage and the switched terminals in such manner that, as long as current is permitted to flow freely between the switched terminals, substantially the full magnitude of the DC voltage is applied across the inductor means, thereby to cause current to flow through the inductor means and therefore between the switched terminals; and control means operative to provide a control voltage to the control terminals, this control voltage alternating periodically between: (i) having a magnitude less than the threshold level, thereby substantially preventing current from flowing between the switched terminals; and (ii) having, substantially for as long as current is flowing between the switched terminals, a magnitude that exceeds the threshold level by an amount that is substantially proportional to the magnitude of the current flowing between the switched terminals.

11. The flyback converter of claim 10 wherein:

(i) the control means is operative to provide the control voltage to the control terminals by way of a current-limiting means; and (ii) a bistable threshold means is connected across the control terminals, this threshold means being operative to change from a first state constituting a relatively high resistance to a second state constituting a relatively low resistance as soon as the magnitude of any voltage present across it reaches a predetermined level, thereby to cause the magnitude of the voltage present across the control terminals to precipitously decrease as soon as the magnitude of the control voltage reaches the predetermined level.

12. A flyback converter adapted to be powered from a DC voltage and to provide power to a load, comprising:

a semiconductor switching device having a pair of switched terminals and a pair of control terminals receptive of a control voltage, electric current being: (i) permitted to flow between the switched terminals as long as the magnitude of the control voltage exceeds a threshold level; and (ii) prevented from flowing between the switched terminals as long as the magnitude of the control voltage is below the threshold level;

inductor means connected between the DC voltage and the switched terminals in such manner that, as long as current is permitted to flow between the switched terminals, inductive energy becomes stored in the inductor means;

load means connected with the inductor means and operative to absorb inductive energy therefrom, but only during periods when current is prevented from flowing between the switched terminals; and control means operative to provide a control voltage to the control terminals, this control voltage alternating periodically between: (i) having a magnitude in excess of the threshold level, thereby causing inductive energy to become stored in the inductor means; and (ii) having a magnitude less than the threshold level, thereby preventing current from flowing between the switched terminals and therefore causing any inductive energy stored in the inductor means to be absorbed by the load means; the control means being operative to prevent the magnitude of the control voltage from exceeding the threshold level as long as inductive energy is being absorbed by the load means.

* * * * *